United States Patent Office
3,409,590
Patented Nov. 5, 1968

3,409,590
PROCESS FOR PREPARING EPOXY-CONTAINING CONDENSATES, AND RESULTING PRODUCTS
Alton J. Landua, Maplewood, Clifford D. Marshall, Berkeley Heights, and James R. Todd, North Plainfield, N.J., assignors to Shell Oil Company, New York, N.Y., a corporation of Delaware
No Drawing. Filed Dec. 27, 1966, Ser. No. 604,577
14 Claims. (Cl. 260—47)

This invention relates to a new process for preparing epoxy-containing condensates and to the resulting products. More particularly, the invention relates to an improved process for preparing solid epoxy-containing condensates from polyepoxides and amines, and to the resulting superior epoxy-containing adducts.

Specifically, the invention provides a new and highly efficient process for preparing epoxy-containing adducts of uniform properties using lower reaction temperatures, which process comprises mixing and reacting a polyepoxide, and preferably a liquid glycidyl polyether of a polyhydric phenol, with controlled amounts of an amine, and preferably an aromatic amine, such as aminophenol, in the presence of a special catalyst having an acidity ($K_A$ value) of at least $10^{-3}$ to $10^{-6}$, such as, for example, salicylic acid.

The invention further provides a new group of solid highly active epoxy-containing adducts prepared by the above-noted process which are particularly suited for use in many applications where the presently available polyepoxide resins are unsuited because of their low reactivity or insufficient properties.

Present commercial Bisphenol A based epoxy resins, such as the glycidyl ethers of 2,2-bis(4-hydroxyphenyl)-propane, have achieved wide varied utilization. However, their utility in certain areas is limited by (1) too low a reactivity, (2) insufficient properties, and (3) too high a cost. Therefore, a series of epoxy resins offering improvement in these areas but retaining similar curing technology in existing equipment should find wide commercial acceptance in a short time.

We have found a new series of epoxy resins which meets these needs. These are obtained by condensing polyepoxide resins with controlled amounts of amines, and preferably aromatic amines, to give solid adducts. These adducts, however, have been difficult to prepare by using known condensation method. To get a satisfactory reaction rate one must utilize a high reaction temperature. This initiates other reactions and yields impure and non-uniform products. Use of such high temperatures also increase the changes of "runaway" reactions and gellation of the reaction mixture.

It is an object of the invention, therefore, to provide a new process for preparing epoxy-containing condensates. It is a further object to provide a new method for preparing epoxy-containing condensates that can be accomplished at a lower reaction temperature. It is a further object to provide a new process for condensing polyepoxides with amines to give more uniform products and higher yields of product. It is a further object to provide a new process for condensing polyepoxides with amines which avoids the danger of "runaway" reactions. It is a further object to provide a new class of epoxy-containing condensates which have improved reactivity. It is a further object to provide new epoxy-containing condensates which have improved properties which permit their use in new areas of application. These and other objects of the invention will be apparent from the following detailed description thereof.

It has now been discovered that these and other objects may be accomplished by the new process of the invention comprising mixing and reacting a polyepoxide, and preferably a liquid glycidyl polyether of a polyhydric phenol, with controlled amounts of an amine, and preferably an aromatic amine, such as aminophenol, in the presence of a special catalyst having an acidity ($K_A$ value) of at least $10^{-3}$ to $10^{-6}$, such as, for example, salicylic acid. It has been found that by the use of this technique one can effect the condensation reaction at very low temperatures, such as of the order of ambient temperature to 65° C. in the initiating phase and 150° C. to 200° C. in the latter stages of the reaction. Furthermore, the resulting products have surprisingly good uniformity and further purification and separation is not necessary. Finally, it has been found that the new epoxy-containing condensates prepared by this novel reaction having surprisingly good properties which enable their use in application where the prior known epoxy resins have been entirely unsuited.

The process of the invention comprises mixing and reacting a polyepoxide in controlled amounts with an amine in the presence of the special catalyst. The polyepoxides that can be used in the process comprise those organic materials which have more than one vic-epoxy group, i.e., more than one

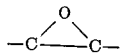

group, which group may be in a terminal position, i.e., a

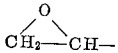

group or in an internal position, i.e., a

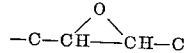

The polyepoxides may be saturated or unsaturated, aliphatic, cycloaliphatic, aromatic or heterocyclic and may be substituted with substituents, such as chlorine, hydroxyl group, ether radicals, and the like.

Examples of such polyepoxides include, among others, 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4'-epoxybutoxy)diphenyl dimethylmethane,
1,3-bis(4,5-epoxypentoxy)-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A),
2,2-bis(4-hydroxyphenol)butane,
4,4'-dihydroxybenzophenone,
bis(4-hydroxyphenyl)ethane,
2,2-bis(4-hydroxyphenyl)pentane, and
1,5-dihydroxynaphthalene.

The halogen-containing epoxides may be further exemplified by 3-chloro-2,3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers are glycidyl polyethers of polyhydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, C and D.

Another group of polyepoxides comprises the polyepoxy polyethers obtained by reacting, preferably in the presence of an acid-acting compound, such as hydrofluoric acid, or of the aforedescribed halogen-containing epoxides, such as epichlorohydrin, with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)dimethylmethane and the like.

The preparation of suitable polyepoxide polyethers is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 30 and 1,000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut, and dehydrated castor oil, methyl linoleate, butyl linoleate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate,
di(2,3-epoxybutyl)oxalate,
di(2,3-epoxyhexyl)succinate,
di(2,3-epoxyoctyl)tetrahydrophthalate,
di(4,5-epoxydodecyl)maleate,
di(2,3-epoxybutyl)terephthalate,
di(2,3-epoxypentyl)thiodipropionate,
di(2,3-epoxybutyl)citrate and
di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate,
3,4-epoxyhexyl 3,4-epoxypentanoate,
3,4-epoxycyclohexyl 3,4-cyclohexanoate,
3,4-epoxycyclohexylmethyl 2,3-epoxycyclohexanoate, and
3,4-epoxycyclohexyl 4,5-epoxyoctanoate
and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate,
dibutyl 7,8,11,12-diepoxyoctadecanedioate,
dioctyl 10,11-diethyl-8,9,12,13-diepoxyeicosanedioate,
dicyclohexyl 3,4,5,6-diepoxycyclohexane-dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons such as epoxidized 2,3-bis(cyclohexenyl)propane, 2,2-bis(cyclohexenyl)butane, 8,10-octadecadiene and the like.

Polyepoxides having an epoxy equivalent weight of between 400 and 4,000 are preferred. Polyepoxides having an average molecular weight between 300 to 1,000 are particularly preferred.

The other component to be used in making the special adducts comprise an amine, and preferably an aromatic amine. These amines have at least two hydrogen attached to amino nitrogen and the amino nitrogen is or are preferably attached to an aromatic ring. Examples of the amines include, among others, aniline, methylene dianiline, meta-phenylene diamine, metaaminophenol, cyclohexylamine, hexamethylene diamine, toluidine, alpha-naphthylamine, beta-naphthylamine, aminodiphenyl, piperazine, N,N'-dimethyl-m-phenylenediamine, 4,4'-diaminophenylsulfone, 4,4'-diaminophenylpropane, 4,4'-diaminodiphenylethane, and the like, and mixtures thereof.

Particularly preferred amines to be used include the primary amines and preferably aromatic primary mono- and diamines possessing from 1 to 2 amino nitrogen attached to aromatic rings and containing from 6 to 24 carbon atoms.

The acid catalyst to be employed in the process may be any inorganic or organic acid material having an acidity or $K_A$ value of $10^{-3}$ to $10^{-6}$. Examples of these acid catalysts include, among others, salicylic acid, thioglycolic acid, acetic acid, benzoic acid, monochloroacetic acid, resorcinol and the like.

The adducts are prepared by combining one or more of the above-described polyepoxides with one or more of the above-noted amines in the presence of the catalyst and heating the resulting mixture. In order to obtain the desired adducts instead of gelled resinous masses which are useless for the present purpose, it is necessary that an important detail be observed, namely, that a proper proportion of a reactant be used. In order to obtain the desired products, one should employ a slight excess of the polyepoxide. The equivalent excess of the polyepoxide should vary from about .33 to .033 equivalents. By chemical equivalent amount as used herein is meant that amount needed to furnish one epoxide group for every amino hydrogen.

If one uses an amine which has a functionality greater than 2, the amount of polyepoxide and amine used should be such that the total overall average functionality of reactants should be between 2 and 2.5. This overall functionality can be determined by the following equation:

$$\frac{\frac{(X)(WX)}{(MX)}+\frac{Y(WY)}{(MY)}+\ldots*}{\text{Total number of moles of reactants}}=2 \text{ to } 2.5$$

$X$ = number of epoxy groups per mole of the polyepoxide.
$MX$ = molecular weight of the amine.
$WX$ = weight percent of total reactants of polyepoxide.
$Y$ = number of amine hydrogen atoms on amine molecule.
$MY$ = molecular weight of the polyepoxide.
$WY$ = weight percent of total reactants of amine.

*If more than one amine or polyepoxide is used, the equation should be continued with the same information about the reactant.

The temperature employed in the formation of the adducts may vary from about 20° C. to 250° C. It is generally preferred to initiate the condensation at a low temperature, e.g., 20° C. to 110° C. and then allow the reaction to exotherm to no higher than about 250° C. Cooling may be applied as needed. The period at the higher temperature should be as short as possible, e.g., 1 to 20 minutes, in order to avoid danger of runaway reactions. The reaction is preferably effected under atmospheric pressure although superatmospheric or subatmospheric pressures may be utilized as desired.

Solvents or diluents may be employed in the reaction if desired, but in most cases one or more of the reactants will be liquid and the mixing can be effected without the use of solvents. Suitable solvents if needed, include xylene, benzene, cyclohexane, dioxane, diethyl ether and the like.

The adducts may be recovered from the reaction mixture by any suitable means. If solvents or diluents are employed, they may be removed by evaporation, distillation, and the like. In the absence of such solvents or diluents, the adducts are generally recovered and used as the crude reaction product.

The adducts prepared by the process of the invention will be solid products having a softening point preferably between 50° C. to 150° C. and more preferably 75° C. to 140° C. These softening points are determined by the Hercules method. The adducts will also preferably have a WPE value of 300 to 3000. WPE is weight in grams of the condensate needed to supply 1 epoxy group. It is determined by a silver nitrate-HC1 method. According to this method, the condensate is added to a solution of HC1 in tetrahydrofuran wherein the epoxy groups react with the HC1. The solution is then back titrated with silver nitrate to determine unreacted HC1. A sample without the condensate is also titrated with $AgNO_3$. The calculation is determined by the formula:

$$\left(\begin{array}{c}\text{milliliters of } AgNO_3 \\ \text{for reagent sample}\end{array} - \begin{array}{c}\text{milliliters of } AgNO_3 \\ \text{used for sample containing condensate}\end{array}\right)\left(\begin{array}{c}\text{Normality of} \\ AgNO_3\end{array}\right)$$
$$\overline{\text{Weight of Condensate Sample}} =$$

$X$ (milliequivalents) of epoxie per gram of sampy $$\frac{1(100)}{\frac{(X)(100)}{(1000)}}=WPE$$

or $$\frac{1000}{(X)}=WPE$$

In general, the lower the WPE the more reactive the adduct. Adducts having WPE over 625 are generally preferred when highly flexible products are desired.

The epoxy-containing adducts prepared by the novel process of the invention are highly reactive and can be cured by heat alone, say at temperatures in excess of 150° C. for extended periods of time, or with epoxy resin curing agents to form hard insoluble infusible products. Curing agents that can be utilized include, among others, amines amino-containing polymers, polybasic acids, acid anhydrides, salts, mercaptans, hydrazines, $BF_3$-complexes, and the like, and mixtures thereof. Specific examples of such materials include, among others, meta-phenylenediamine, p-phenylene diamine, diaminodiphenyl-sulfone, p,p'-methylene dianiline, p,p-diaminodiphenylmethane, triaminobenzene, 2,4-diaminotoluene, tetraaminobenzene, 3,3'-diamino diphenyl, 1,3-diamino-4-isopropylbenzene, 1,3 - diamino - 4,5 - diethylbenzene, diaminostilbene, triethylamine, ethylene diamine, diethylamine, diethylene triamine, triethylene tetramine, tetraethylene pentamine, pyridine, diaminopyridine, piperidine, N,N' - diethyl-1,3-propanediamine, dicyandiamide, melamine, fatty acid salts of amines, such as the 2-ethylhexoate of tris(dimethylaminomethyl)phenol adducts of polyepoxides such as those described hereinafter, and the above-described mono- and polyamines, as the adduct of p-phenylene diamine and styrene oxide, the adduct of p-phenylene diamine and allyl glycidyl ether, the adduct of diglycidyl ether of 2,2-bis(4-hydroxyphenyl)propane and diethylene triamine, the adducts of diethylene triamine and ethylene oxide, the adduct of diethylene triamine and styrene oxide, the adducts of polyamines and unsaturated nitriles, such as the adducts of polyamines and unsaturated nitriles, such as the adduct of diethylene triamine and acrylonitrile, the adduct of diethylene triamine and unsaturated sulfolanes, and the adduct of p-phenylene diamine and acrylonitrile.

Other examples include the amino-containing polyamides as described in U.S. Patent No. 2,450,940 and the monomeric amides described in U.S. Patent No. 2,832,799.

Other examples include the acid anhydrides, such as phthalic anhydride, succinic anhydride, dodecenylsuccinic anhyride, maleic anhydride tetrahydrophthalic anhydride, pyromellitic anhydride, hexachlorophthalic anhydride, methyl Nadic anhydride, anhydrides obtained by reacting maleic anhyride with unsaturated compounds, such as oils, terpinene, long chain unsaturated acids and the like as well as anhydrides obtained by reacting long chain acids with acetic anhydride and the like.

Still other examples include the salts, such as magnesium perchlorate, zinc fluoborate, potassium persulfate, copper fluoborate, cupric arsenate, zinc persulfate, cupric fluosilicate, cupric iodate, cupric sulfate, magnesium nitrate, magnesium phosphate, stannic fluoborate, zinc nitrate, and the like, as well as the chloride derivatives as aluminum chloride, zinc chloride, ferric chloride and the like.

Still other examples include $BF_3$ and $BF_3$ adducts with various materials, such as amines, amides, ethers, phenols and the like.

As the condensates can be cured by heat alone, the amount of the curing agents employed will vary over a wide range. The amount of the curing agents having active hydrogen as well as the agents such as acid anhydrides are preferably employed so as to furnish at least .6 equivalent, and still more preferably, .8 to 1.5 equivalents per equivalent of the polyepoxide. As used herein in relation to the amount of curing agent, "equivalent" means that amount needed to furnish 1 active hydrogen or anhydride group per epoxy group. The other curing agents, such as metal salts, tertiary amines, $BF_3$, and the like are preferably used in amounts varying from about .1% to 6% by weight of the material being cured.

The new epoxy-containing adducts can be utilized for a great many different applications, such as in preparation of moldings, castings, pottings, coatings and impregnating compositions, laminates, filament winding operations, and the like.

The solid adducts are particularly suitable for use in the preparation of powdered compositions for use in molding operations or in fluidized bed systems. The preparation of such powdered coating compositions is disclosed and claimed in copending patent application Ser. No. 604,561 filed Dec. 27, 1966.

The solid adducts are also useful in the preparation of fluid coating compositions in admixture with solvents and suitable curing agents. The preparation and use of such coating compositions is disclosed and claimed in copending patent application Ser. No. 604,586 filed Dec. 27, 1966.

To illustrate the manner in which the present invention may be carried out, the following examples are given. The examples are given only to illustrate the invention and are not to be regarded as limiting the scope of the invention in any way. Unless otherwise indicated, parts and percentages disclosed in the examples are by weight. The polyether referred to by letter, such as Polyether A, are those disclosed in U.S. 2,633,458.

EXAMPLE I

This example illustrates the superior preparation of a highly reactive solid adduct from Polyether A (glycidyl polyether of 2,2-bis(4-hydroxyphenyl)propane) and aniline in the presence of salicylic acid.

(A) 84.3 Parts of Polyether A was combined with 15.2 parts of aniline and to this mixture was added 0.5 part of salicylic acid. The mixture was heated to an initiation temperature of 62° C. over a period of 13 minutes. The temperature then rose to 201 C. over a period of 19 minutes. The mixture was held at 201° C. for 11–12 minutes and then poured out and cooled to room temperature. The resulting solid product had a softening point of 100–108° C. and a WPE of 932.

(B) To show the superior results obtained, the above preparation was repeated in the absence of salicylic acid. 84.4 parts of the Polyether A was combined with 15.6 parts of aniline and the mixture heated to an initiation temperature of 109° C. over a period of 33 minutes. The temperature then rose to 243° C. over a period of 21 minutes and was held for 2 minutes at 243° C. The product was then poured out and cooled to room temperature. The product has a softening point of 100–109° C. and a WPE of 889. Analysis of the product indicated it had a lower degree purity than the product prepared under (A) above, and repeated operations gave products of less uniform properties.

EXAMPLE II

This example illustrates the preparation of another adduct from Polyether A, aniline and salicylic acid using a different set of reaction temperatures.

84.9 Parts of Polyether A was combined with 14.6 parts of aniline and to this mixture was added .5 part of salicylic acid. The mixture was heated to an initiation temperature of 49° C. over a period of 6 minutes and the temperature then rose to 192° C. over a 30 minute period. The mixture was held at that temperature for 11 minutes, and then dumped to cool to room temperature. The resulting product had a WPE of 826 and a softening point of 96–104° C. This product was easily cured by heating with 5% by weight of imidazole at 150° C. to form a hard insoluble infusible resin.

EXAMPLE III

This example illustrates the preparation of an adduct from Polyether A, a mixture of aniline and methylene dianiline, and salicylic acid.

85.30 Parts of Polyether A, 13.06 parts of aniline, 1.14 parts of methylene dianiline were mixed together and to this mixture was added 0.5 part of salicylic acid. This mixture was heated to 50° C. over a period of 15 minutes and the temperature then rose to 167° C. over a period of 35 minutes. The temperature was held at 167° C. for 7 minutes and then cooled to room temperature. The product was a solid resin having a softening point of 95–105° C. and a WPE of 708.

The above product was easily cured by heating with 4% imidazole at 150° C. The resulting product was a hard insoluble infusible casting.

EXAMPLE IV

This example illustrates the preparation of another adduct from Polyether A a mixture of aniline and methylene dianiline and salicylic acid.

86.2 Parts of Polyether A was combined with 9.8 parts of aniline and 3.5 parts of methylene dianiline. To this mixture was added .5 part of salicylic acid. This mixture was heated to 52° C. over a period of 8 minutes. The temperature then rose to 184° C. in about 3 minutes. The product was then dumped and cooled to room temperature. The resulting product was a solid resin having a WPE of 640 and a softening point of 96–105° C.

The above product was easily cured by heating with 3% imidazole at 150° C. The resulting product was a hard insoluble infusible casting.

EXAMPLE V

Example I was repeated varying the amount of Polyether A and aniline. The results are shown in the table below:

POLYETHER A-ANILINE

| Percent by weight | | | Product | |
|---|---|---|---|---|
| Polyether A | Aniline | Salicylic Acid | WPE | Hercules S.P., ° C. |
| 84.9 | 14.6 | 0.5 | 817 | 101–106 |
| 84.0 | 15.5 | 0.5 | 958 | 109–113 |
| 81.8 | 17.7 | 0.5 | 2,195 | 123–132 |
| 86.3 | 13.2 | 0.5 | 640 | 94–105 |
| 86.3 | 13.2 | 0.5 | 642 | 96–105 |

EXAMPLE VI

Adducts of Polyether A and a mixture of aniline and methylene dianiline were prepared as shown in Example IV. The proportions and results are shown in the table below:

POLYETHER A-ANILINE-MDA

| Percent by weight | | | | Product | |
|---|---|---|---|---|---|
| Polyether A | Aniline | MDA | Salicylic Acid | WPE | Hercules S.P., ° C. |
| 86.1 | 9.9 | 3.5 | 0.5 | 620 | 96–103 |
| 86.2 | 9.8 | 3.5 | 0.5 | 630 | 108–111 |

EXAMPLE VII

Adducts of Polyether A and a mixture of aniline and metaphenylene diamine were prepared by the method shown in Example IV. The proportions and results are shown in the table below:

POLYETHER A-ANILINE-PHENYLENE DIAMINE

| Percent by weight | | | | Product | |
|---|---|---|---|---|---|
| Polyether A | Aniline | Metaphenylene Diamine | Salicylic Acid | WPE | Hercules S.P., °C. |
| 87.4 | 10.1 | 2.0 | 0.5 | 631 | 99–104 |
| 87.6 | 9.9 | 2.0 | 0.5 | 645 | 97–105 |

EXAMPLE VIII

Examples I to VII are repeated with the exception the salicylic acid is replaced by each of the following: Thioglycolic acid, monochloroacetic acid, benzoic acid, acetic acid and resorcinol. Related results are obtained.

We claim as our invention:

1. A process for preparing highly reactive solid acetone-soluble epoxy-containing condensates which comprises mixing and reacting a polyepoxide having more than one vic-epoxy group with an aromatic monoamine having at least two active hydrogen atoms in the presence of an acidic compound having a $K_A$ value between $10^{-3}$ and $10^{-6}$, the polyepoxide and amine being combined so that there is a chemical equivalent excess of epoxide varying from .33 to .033.

2. A process for preparing highly active solid acetone-soluble epoxy-containing condensates having a softening point of at least 65° C. and a WPE of at least 400 which comprises mixing and reacting a glycidyl polyether of a polyhydric alcohol or phenol with an aromatic monoamine having at least two active hydrogen atoms in the presence of an organic acid having a $K_A$ value of $10^{-3}$ to $10^{-6}$, at a temperature between ambient and 250° C., the glycidyl polyether and the aromatic amine being combined so that there is a chemical equivalent excess of epoxide varying from .33 to .033.

3. A process as in claim 2 wherein the organic acid is salicylic acid.

4. A process as in claim 2 wherein the aromatic amine is aniline.

5. A process as in claim 2 wherein the aromatic amine is meta-aminophenol.

6. A process as in claim 2 wherein the glycidyl ether is a polyglycidyl ether of 2,2-bis(4-hydroxyphenyl)propane.

7. A process as in claim 2 wherein the reaction mixture is first reacted at 20° C. to 110° C. for a few minutes and then the temperature allowed to raise to not greater than 250° C. for a period not greater than 20 minutes.

8. A process as in claim 2 wherein the polyglycidyl ether and the aromatic amine are combined in an equivalent ratio of 1.2:1 to 1.033:1.

9. A highly reactive solid acetone-soluble epoxy-containing adduct of a polyepoxide having more than one vic-epoxy group with an aromatic monoamine having two active hydrogen attached to nitrogen, said adduct having a softening point between 50° C. and 150° C., a weight per epoxide between 300 and 3000.

10. An adduct as defined in claim 9 wherein the polyepoxide is a liquid glycidyl ether of 2,2-bis(4-hydroxyphenyl)propane.

11. An adduct as defined in claim 9 wherein the aromatic amine is meta-aminophenol.

12. An adduct as defined in claim 9 wherein the aromatic amine is aniline.

13. An insoluble infusible product obtained by heating the adduct of claim 9 with an epoxy resin curing agent.

14. An insoluble infusible product obtained by heating the adduct of claim 9 with an amine curing agent.

References Cited

UNITED STATES PATENTS 3,317,471   5/1967   Johnson et al.

WILLIAM H. SHORT, *Primary Examiner.*

T. D. KERWIN, *Assistant Examiner.*